(12) United States Patent
Choudhury

(10) Patent No.: US 8,605,791 B2
(45) Date of Patent: Dec. 10, 2013

(54) VIDEO PROCESSOR USING AN OPTIMIZED SLICEMAP REPRESENTATION

(75) Inventor: Himadri Choudhury, Santa Clara, CA (US)

(73) Assignee: Nvidia Corporation, Santa Clara, CA (US)

(*) Notice: Subject to any disclaimer, the term of this patent is extended or adjusted under 35 U.S.C. 154(b) by 906 days.

(21) Appl. No.: 12/275,471

(22) Filed: Nov. 21, 2008

(65) Prior Publication Data

US 2010/0128796 A1    May 27, 2010

(51) Int. Cl.
- *H04N 7/24*    (2011.01)
- *H04N 7/26*    (2006.01)
- *H04N 7/14*    (2006.01)
- *H04N 7/30*    (2006.01)
- *H04N 7/50*    (2006.01)

(52) U.S. Cl.
USPC ............ 375/240.24; 375/240.01; 375/240.03; 375/240.25; 348/14.08

(58) Field of Classification Search
USPC ............ 375/240.24, 240.01, 240.03, 240.25; 348/14.08
See application file for complete search history.

(56) References Cited

U.S. PATENT DOCUMENTS

| | | | |
|---|---|---|---|
| 6,111,913 A | 8/2000 | Murdock et al. | |
| 6,332,003 B1 | 12/2001 | Matsuura et al. | |
| 7,206,456 B2 | 4/2007 | Hannuksela et al. | |
| 7,826,529 B2 | 11/2010 | Lee et al. | |
| 8,228,997 B1 | 7/2012 | Cahalan et al. | |
| 2002/0025077 A1 | 2/2002 | De Haan et al. | |
| 2005/0169371 A1 | 8/2005 | Lee et al. | |
| 2005/0231588 A1* | 10/2005 | Yang et al. | 348/14.08 |
| 2007/0115366 A1 | 5/2007 | Tsubaki | |
| 2008/0025392 A1 | 1/2008 | Lee et al. | |
| 2008/0225945 A1 | 9/2008 | Wu et al. | |
| 2008/0253463 A1 | 10/2008 | Lin et al. | |
| 2009/0086816 A1 | 4/2009 | Leontaris et al. | |
| 2009/0274209 A1* | 11/2009 | Garg et al. | 375/240.03 |
| 2010/0054339 A1* | 3/2010 | Schlanger et al. | 375/240.25 |

FOREIGN PATENT DOCUMENTS

EP    2061249 A1 *    5/2009

OTHER PUBLICATIONS

Adaptive encoding of zoomable video streams based on user access pattern Khiem Quang Minh Ngo, Ravindra Guntur, Wei Tsang Ooi; Feb. 2011; MMSys '11: Proceedings of the second annual ACM conference on Multimedia systems; Publisher: ACM; pp. 211-222.*
"Adaptive encoding of zoomable video streams based on user access pattern"; Khiem Quang Minh Ngo, Ravindra Guntur, Wei Tsang Ooi; Feb. 2011; MMSys '11 : Proceedings of the second annual ACM conference on Multimedia systems; Publisher: ACM; pp. 211-222.*

\* cited by examiner

*Primary Examiner* — Nirav B Patel
*Assistant Examiner* — Courtney Fields

(57) ABSTRACT

A method for executing video encoding operations. The method includes encoding an incoming video stream into a plurality of macro blocks by using a video encoder and receiving a box out slice map specification for the plurality of macro blocks. The box out slice map specification is converted to a foreground-background slice map specification. The plurality of macro blocks are then processed in accordance with the foreground-background specification and by using a common hardware encoder front end.

18 Claims, 7 Drawing Sheets

VIDEO PROCESSOR USING AN OPTIMIZED SLICEMAP REPRESENTATION

FIELD OF THE INVENTION

The present invention is generally related to digital computer systems.

BACKGROUND OF THE INVENTION

The display of images and full-motion video is an area of the electronics industry improving with great progress in recent years. The display and rendering of high-quality video, particularly high-definition digital video, is a primary goal of modern video technology applications and devices. Video technology is used in a wide variety of products ranging from cellular phones, personal video recorders, digital video projectors, high-definition televisions, and the like. The emergence and growing deployment of devices capable of high-definition video generation and display is an area of the electronics industry experiencing a large degree of innovation and advancement.

The video technology deployed in many consumer electronics-type and professional level devices relies upon one or more video processors to format and/or enhance video signals for display. This is especially true for digital video applications. For example, one or more video processors are incorporated into a typical set top box and are used to convert HDTV broadcast signals into video signals usable by the display. Such conversion involves, for example, scaling, where the video signal is converted from a non-16×9 video image to a image that can be properly displayed on a true 16×9 (e.g., widescreen) display. One or more video processors can be used to perform scan conversion, where a video signal is converted from an interlaced format, in which the odd and even scan lines are displayed separately, into a progressive format, where an entire frame is drawn in a single sweep.

Additional examples of video processor applications include, for example, signal decompression, where video signals are received in a compressed format (e.g., MPEG-4, H264, H263, etc.) and are decompressed and formatted for a display. Another example is re-interlacing scan conversion, which involves converting an incoming digital video signal from a DVI (Digital Visual Interface) format to a composite video format compatible with the vast number of older television displays installed in the market.

More sophisticated users require more sophisticated video processor functions, such as, for example, In-Loop/Out-of-loop deblocking filters, advanced motion adaptive de-interlacing, input noise filtering for encoding operations, polyphase scaling/re-sampling, sub-picture compositing, and processor-amplifier operations such as, color space conversion, adjustments, pixel point operations (e.g., sharpening, histogram adjustment etc.) and various video surface format conversion operations.

One of the more popular features for incorporation into modern video processors is the implementation of powerful real-time video compression. Video compression, or video encoding, typically operates on square-shaped groups of neighboring pixels, often called "macro blocks." These pixel groups, or macro blocks, are compared from one frame to the next, or within the same frame, and the video compression codec (e.g., for an encode-decode scheme) sends only the differences within those blocks. This works extremely well if the video has small on amounts of motion. A still frame of text, for example, can be repeated with very little transmitted data. In areas of video with more motion, more pixels change from one frame to the next, and thus, the video compression scheme must send more data to keep up with the larger number of pixels that are changing.

Typically, some of the most compelling content can have very intense action scenes (e.g., large amounts of motion, explosions, special effects etc.). It takes a very powerful video processing architecture to handle such intense video. Such video typically has a great deal of high frequency detail, and in order to maintain the frame rate, the video processor needs to either decrease the quality of the video, or increase the bit rate of the video to render this added information with the same level of detail.

Engineers have turned to hardware-based encoding solutions, where the computations needed to encode real-time full motion video are implemented in hardware-based logic. The hardware-based implementation is designed to provide sufficient power and efficiency given the time constraints of real-time video encoding, power consumption requirements (especially for mobile devices), silicon die space requirements, and the like.

The problem with providing such sophisticated hardware based video encoding functionality is the fact that a video processor needs to deliver acceptable performance and under conditions where the encoding format is variable (e.g., varying encoding standards, varying slicing map specifications, etc.). Having a sufficiently powerful architecture to implement such encoding functions can be excessively expensive for many types of devices. The more sophisticated the video processing functions, the more expensive, in terms of silicon die area, transistor count, memory speed requirements, etc., the integrated circuit device required to implement such functions.

Thus what is needed, is a new video encoding system that overcomes the limitations on the prior art. The new video encoding system should be capable of dealing with varying encoding formats and have a high encoding performance to handle the sophisticated video functions expected by increasingly sophisticated users.

SUMMARY OF THE INVENTION

Embodiments of the present invention provide a new video encoding system that is capable of dealing with varying encoding formats and that has a high encoding performance to handle the sophisticated video encoding functions expected by increasingly sophisticated users.

In one embodiment, the present invention is a computer implemented method for executing video encoding operations. The method includes encoding an incoming video stream into a plurality of macro blocks by using a video encoder. A box out slice map specification for the plurality of macro blocks is received (e.g., from an application executing on the video encoder, or the like). The box out slice map specification is converted to a foreground-background slice map specification. The plurality of macro blocks are then processed in accordance with the foreground-background specification. The processing is performed by a common hardware encoder front end.

In one embodiment, a software driver of the video encoder performs the converting of the box out slice map specification to the foreground-background slice map specification.

In this manner, the conversion enables the common hardware encoder front end to be streamlined for a single type (e.g., the foreground-background type) of slice map specification. This attribute enables the optimization of the hardware resources of the common hardware encoder front end to

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION OF THE INVENTION

Figure 1:
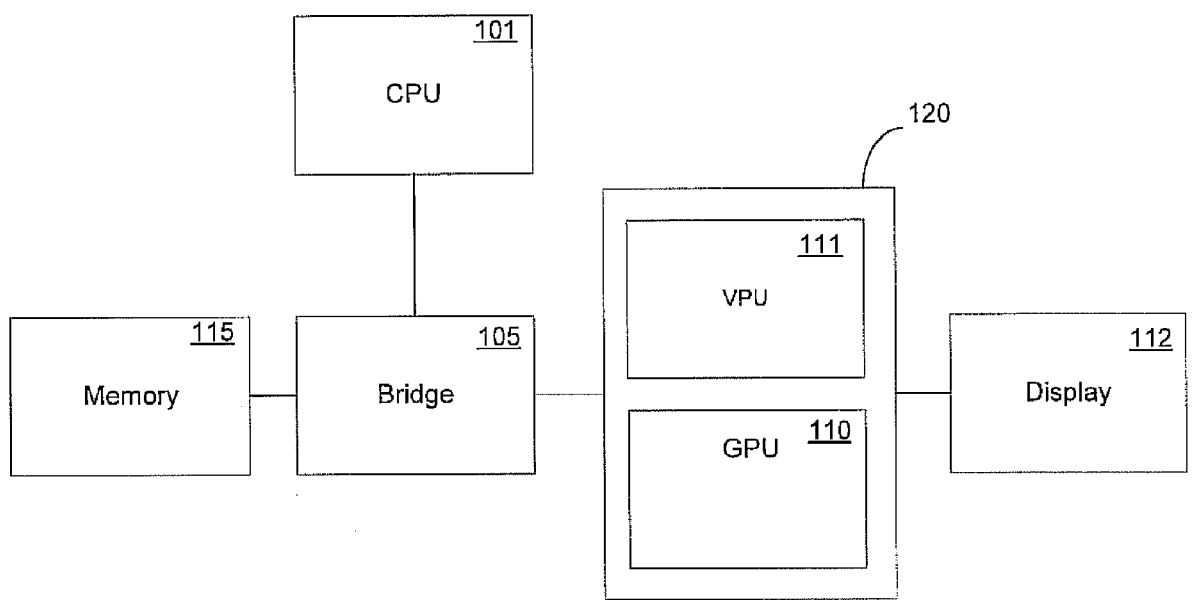
FIG. 1 shows a diagram of an exemplary generalized computer system architecture in accordance with one embodiment of the present invention.

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

Notation and Nomenclature:

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "executing" or "storing" or "rendering" or the like, refer to the action and processes of a computer system, or similar electronic computing device (e.g., system 100 of FIG. 1), that manipulates and transforms data represented as physical (electronic) quantities within the computer system's registers and memories and other computer readable media into other data similarly represented as physical quantities within the computer system memories or registers or other such information storage, transmission or display devices.

Computer System Platform:

FIG. 1 shows a computer system 100 in accordance with one embodiment of the present invention. Computer system 100 depicts the components of a basic computer system in accordance with embodiments of the present invention providing the execution platform for certain hardware-based and software-based functionality. In general, computer system 100 comprises at least one CPU 101, a system memory 115, and at least one graphics processor unit (GPU) 110. The CPU 101 can be coupled to the system memory 115 via a bridge component/memory controller (not shown) or can be directly coupled to the system memory 115 via a memory controller (not shown) internal to the CPU 101. Computer system 100 includes a processor component 120 that has the GPU 110 and a VPU 111 (video processor unit). The GPU 110 is coupled to a display 112. One or more additional GPUs can optionally be coupled to system 100 to further increase its computational power. The GPU(s) 110 is coupled to the CPU 101 and the system memory 115. The VPU 111 is for executing video processing operations, video encoding and decoding, and the like.

System 100 can be implemented as, for example, a desktop computer system or server computer system, having a powerful general-purpose CPU 101 coupled to a dedicated graphics rendering GPU 110. In such an embodiment, components can be included that add peripheral buses, specialized graphics memory, IO devices, and the like. Similarly, system 100 can be implemented as a handheld device (e.g., cellphone, etc.) or a set-top video game console device such as, for example, the Xbox®, available from Microsoft Corporation of Redmond, Wash., or the PlayStation3®, available from Sony Computer Entertainment Corporation of Tokyo, Japan. In one embodiment, the CPU 101, Bridge 105, system memory 115 and processor component 120 can be fabricated as a system-on-a-chip device.

Exemplary Embodiments

Figure 2:
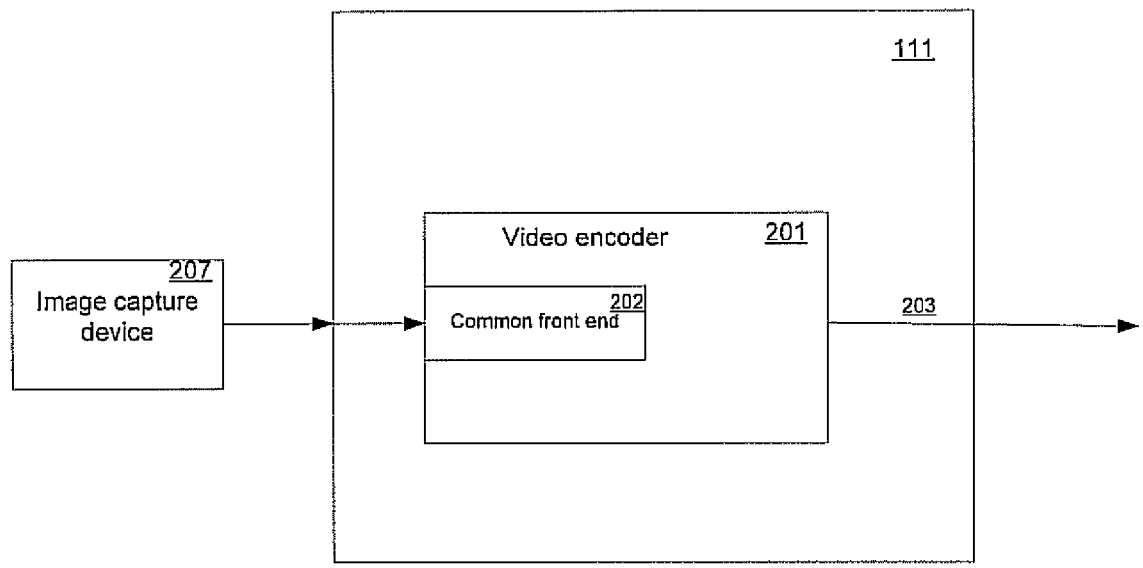
FIG. 2 shows a diagram illustrating the basic components of a video processor in accordance with one embodiment of the present invention.

FIG. 2 shows a diagram illustrating the basic components of a video processor in accordance with one embodiment of the present invention. As depicted in FIG. 2, the VPU 111 is shown including a video encoder 201 connected to receive image information from an image capture device 207.

In the FIG. 2 embodiment, the VPU 111, hereafter referred to as the video processor 111, functions by enabling real-time encoding of video streams. As shown in FIG. 2, the video processor 111 includes the video encoder 201 for encoding an incoming video stream into a plurality of macro blocks. The incoming video stream originates from, for example, the image capture device 207 shown coupled to the video processor 111. The incoming video stream is encoded into a plurality of macro blocks by using a common front end 202 of the video encoder 201. During normal operation, a box out slice map specification for the plurality of macro blocks is received (e.g., from an application executing on the video processor, or the like). The box out slice map specification is converted to a foreground-background slice map specification. The plurality of macro blocks are then processed by the common front in 202 in accordance with the foreground-background specification.

In one embodiment, the common front end 202 is a hardware-based highly optimized common front end. The conversion enables the common hardware encoder front end to be streamlined for a single type (e.g., the foreground-background) of slice map specification. This attribute enables the optimization of the hardware resources of the common hardware encoder front end to provide, for example, sophisticated or high-performance video encoding functions while remaining within comparatively stringent hardware resource budgets. For example, hardware can be implemented for a single type of slice map representation as opposed to providing hardware for two or more types of slice map representations. This attribute saves both silicon die area and overall device power consumption.

In one embodiment, a software driver of the encoder performs the converting of the box out slice map specification to the foreground-background slice map specification. By implementing the conversion in software, algorithms that perform the conversion can be altered in accordance with any specific requirements of a given video application. The software can ensure that regardless of the originating slice map representation, the resulting converted slice map representation (e.g., the foreground-background) will be optimized to execute efficiently on the hardware of the common front end 202.

It should be noted that the original slice map specification can be received from applications or other types of software that happen to be executing on the video encoder or on a processor (e.g., CPU 101 of FIG. 1) coupled to the video encoder. For example, the converting of the box out slice map specification to the foreground-background slice map specification can be implemented by a software driver of the video encoder 201. Additionally, it should be noted that in general, the common encoder hardware front end 202 is optimized to process macro blocks having the foreground-background specification, and that macro blocks having the box out slice map specification are first converted to the foreground-background slice map specification before their processing by the common hardware encoder front end 202.

Figure 3:
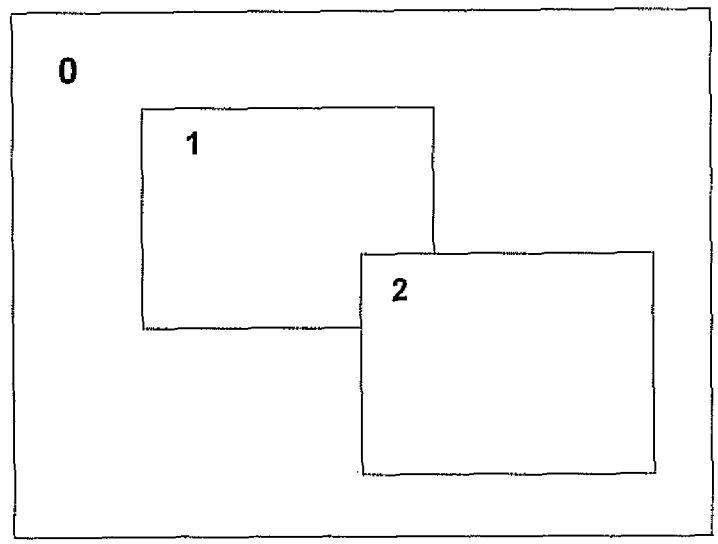
FIG. 3 shows a diagram depicting a foreground-background slice map representation in accordance with one embodiment of the present invention.

FIG. 3 shows a diagram depicting a foreground-background slice map representation in accordance with one embodiment of the present invention. As depicted in FIG. 3, 3 different regions are shown, as indicated by their respective numbers 0, 1, and 2. Each of the 3 regions consists of one or more macro blocks.

As shown in FIG. 3, in an H.264 embodiment, the H.264 standard defines a number of slice map specifications for the flexible macro block order scheme (FMO). As part of this scheme, an application can specify a slice group type for each macro block by defining a slice map for an entire frame. As described above, to provide sufficient power to satisfy the requirements of real time video encoding at high resolutions, these slice maps are decoded in hardware. Implementing the slice-map decoding in hardware takes considerable resources. For example, for each macro block the hardware must decide which slice group it falls into. The hardware must further decide whether it closes a slice group (e.g., thereby enabling the entire slice-group to be written out via the bitstream 203).

Embodiments of the present invention utilize the common hardware encoder front end 202 to perform this encoding. As described above, embodiments of the present invention convert, or re-map, the specification of a "box out" slice-map specification to a "pseudo foreground-background" slice-map specification, thus allowing virtually the identical piece of hardware to implement both slice map types (e.g., the common hardware encoder front end 202). The decoding of pseudo foreground-background slice map in hardware is fast and does not bottleneck or otherwise reduce the rate of video encoding.

As shown in FIG. 3, the foreground-background slice-map type is defined by specifying the rectangular coordinates of the top-left and bottom-right corners of a certain number of possibly overlapping rectangles. Here the rectangular coordinates of "1" and "2" rectangles need to be defined (e.g., x, y screen coordinates). The rectangular coordinates of "0" are simply the max and min screen coordinates (e.g., the top left corner and the bottom right corner of the screen).

Figure 4:
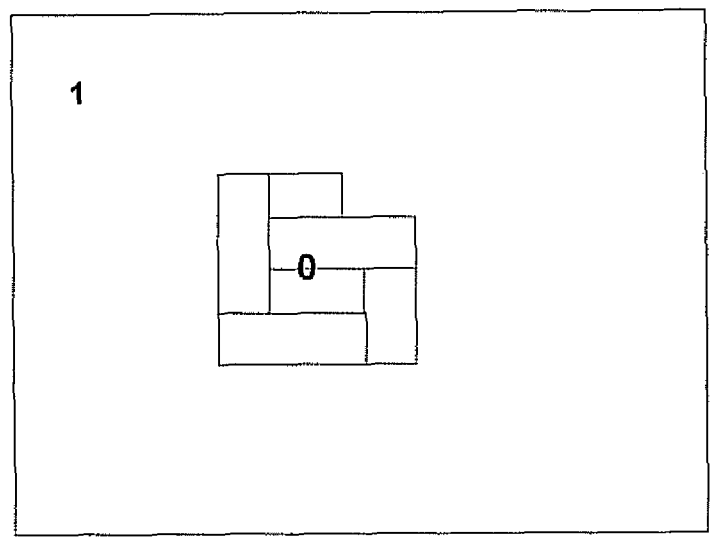
FIG. 4 shows a diagram depicting a box out slice map representation in accordance with one embodiment of the present invention.

FIG. 4 shows a diagram depicting a box out slice map representation in accordance with one embodiment of the present invention. As depicted in FIG. 4, 2 different regions are shown, as indicated by their respective numbers 0 and 1.

The box out slice-map type is defined as the number of macro-blocks in the spiral pattern as shown in FIG. 4. For example, an originating box is defined in the center of the video frame, and subsequent boxes are defined in, for example, a clockwise pattern until a group of boxes spiral out around the originating box. As shown in the FIG. 4 embodiment, those macro blocks residing within the spiral group of boxes in the center of the frame are assigned to region 0. The remaining macro blocks are assigned to region 1.

Figure 5:
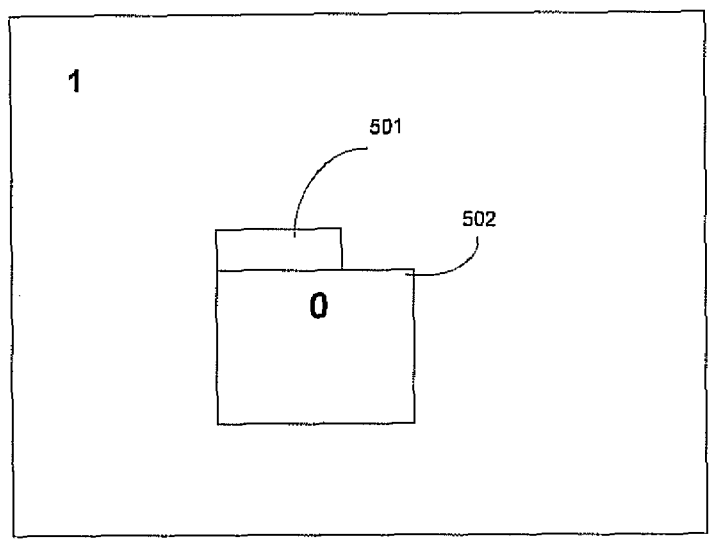
FIG. 5 shows a diagram depicting a converted slice map specification in accordance with one embodiment of the present invention.

FIG. 5 shows a diagram depicting a converted slice map specification in accordance with one embodiment of the present invention. The conversion process of embodiments of the present invention take advantage of the fact that box out type slice-maps can be mapped to a two rectangle foreground-background slice-map. Thus, the macro blocks of region 0 from FIG. 4 are converted to macro blocks comprising the two rectangles 501 and 502, also of region 0. As a result of the conversion, the macro blocks of the region 0 (e.g., rectangles 501-502) can be considered the foreground and the remaining macro blocks of the region 1 can be considered the background in the foreground-background slice map type.

For example, the conversion of a box out slice map as shown in FIG. 4 to a foreground-background slice-map as shown in FIG. 5 is as follows. In general, the spiral box out slice map specification as shown in FIG. 4 is defined by a single number, the number of macro-blocks in the central spiral pattern. The pseudo foreground-background pattern in FIG. 5 is defined by two pairs of rectangular coordinates: the top-left and bottom-right macro-blocks of each of the rectangles. For example, after an application specifies a box out slice map specification, the driver software maps the single number that defines the pattern in FIG. 4 to the two pairs of numbers that defines the pattern in FIG. 5. This allows the common hardware front end 202 that deals with the pseudo foreground-background pattern in FIG. 5 to be virtually identical to the hardware that deals with the real foreground-background pattern in FIG. 3.

An exemplary software algorithm that implements the conversion from the box out type slice map specification to the foreground-background type slice map specification is described by the pseudo code presented below.

```
// Inputs:
// mapUnitsInSliceGroup0: this is the number of MBs in the spiral in the
box-out slice map.
// PicSizeInMapUnits: this is the number of MBs in the picture.
// PicWidthInMbs: picture width in MBs
// PicHeightInMapUnits: picture height in MBs
// slice_group_change_direction_flag: 0 or 1 depending on spiral
direction (clockwise or counter-clockwise)
//
// Outputs
// rect1 : pair of rectangular coordinates defining the top-left and
bottom right of first rectangle in the pseudo foreground-background map
// rect2 : pair of rectangular coordinates defining the top-left and
bottom right of second rectangle in the pseudo foreground-
background map
corner_x[5];
corner_y[5];
corner_idx=0;
for( i = 0; i < PicSizeInMapUnits; i++ )
MapUnitToSliceGroupMap[ i ] = 2;
x = ( PicWidthInMbs − slice_group_change_direction_flag ) / 2;
y = ( PicHeightInMapUnits − slice_group_change_direction_flag ) / 2;
leftBound    = x;
topBound     = y;
rightBound   = x;
bottomBound  = y;
xDir =    slice_group_change_direction_flag − 1;
yDir =    slice_group_change_direction_flag;
for( k = 0; k < PicSizeInMapUnits; k += mapUnitVacant )
{
    mapUnitVacant = ( MapUnitToSliceGroupMap[ y * PicWidthInMbs +
x ] == 2 );
    if( mapUnitVacant )
        MapUnitToSliceGroupMap[ y * PicWidthInMbs + x ] = ( k >=
mapUnitsInSliceGroup0 );
    if( xDir  ==  −1  &&  x  ==   leftBound )
    {
        leftBound = max( leftBound − 1, 0 );
        x = leftBound;
        xDir = 0;
        yDir = 2 * slice_group_change_direction_flag − 1;
        corner_x[corner_idx] = x;
        corner_y[corner_idx] = y;
        corner_idx++;
    }
    else
      if( xDir  ==   1  &&  x   ==   rightBound )
      {
        rightBound = min( rightBound + 1, (int)PicWidthInMbs − 1 );
        x = rightBound;
        xDir = 0;
        yDir = 1 − 2 * slice_group_change_direction_flag;
        corner_x[corner_idx] = x;
        corner_y[corner_idx] = y;
        corner_idx++;
      }
      else
        if( yDir == −1 && y == topBound )
        {
          topBound = max( topBound − 1, 0 );
          y = topBound;
          xDir = 1 − 2 * slice_group_change_direction_flag;
          yDir = 0;
          corner_x[corner_idx] = x;
          corner_y[corner_idx] = y;
          corner_idx++;
        }
        else
          if( yDir == 1 && y == bottomBound )
          {
            bottomBound = min( bottomBound + 1, (int)img-
>PicHeightInMapUnits − 1 );
            y = bottomBound;
            xDir = 2 * slice_group_change_direction_flag − 1;
            yDir = 0;
            corner_x[corner_idx] = x;
            corner_y[corner_idx] = y;
            corner_idx++;
          }
          else
          {
            x = x + xDir;
            y = y + yDir;
          }
}
if (x != corner_x[corner_idx] || y != corner_y[corner_idx]) {
    corner_x[corner_idx] = x;
    corner_y[corner_idx] = y;
    corner_idx++;
}
vector<int, pair<int,int> > rect1;
vector<int, pair<int,int> > rect2;
rect1.push_back(make_pair(corner_x[(corner_idx + 4) % 5],
corner_y[(corner_idx + 4) % 5]));
rect1.push_back(make_pair(corner_x[(corner_idx + 3) % 5],
corner_y[(corner_idx + 3) % 5]));
rect2.push_back(make_pair(corner_x[(corner_idx + 2) % 5],
corner_y[(corner_idx + 2) % 5]));
rect2.push_back(make_pair(corner_x[(corner_idx + 1) % 5],
corner_y[(corner_idx + 1) % 5]));
if (rect1[0].x > rect1[1].x) swap(rect1[0].x, rect1[1].x);
if (rect1[0].y > rect1[1].y) swap(rect1[0].y, rect1[1].y);
if (rect2[0].x > rect2[1].x) swap(rect2[0].x, rect2[1].x);
if (rect2[0].y > rect2[1].y) swap(rect2[0].y, rect2[1].y);
// rect1 and rect2 have the 2 pairs of coordinates that define the
"pseudo foreground/background map"
```

Figure 6:
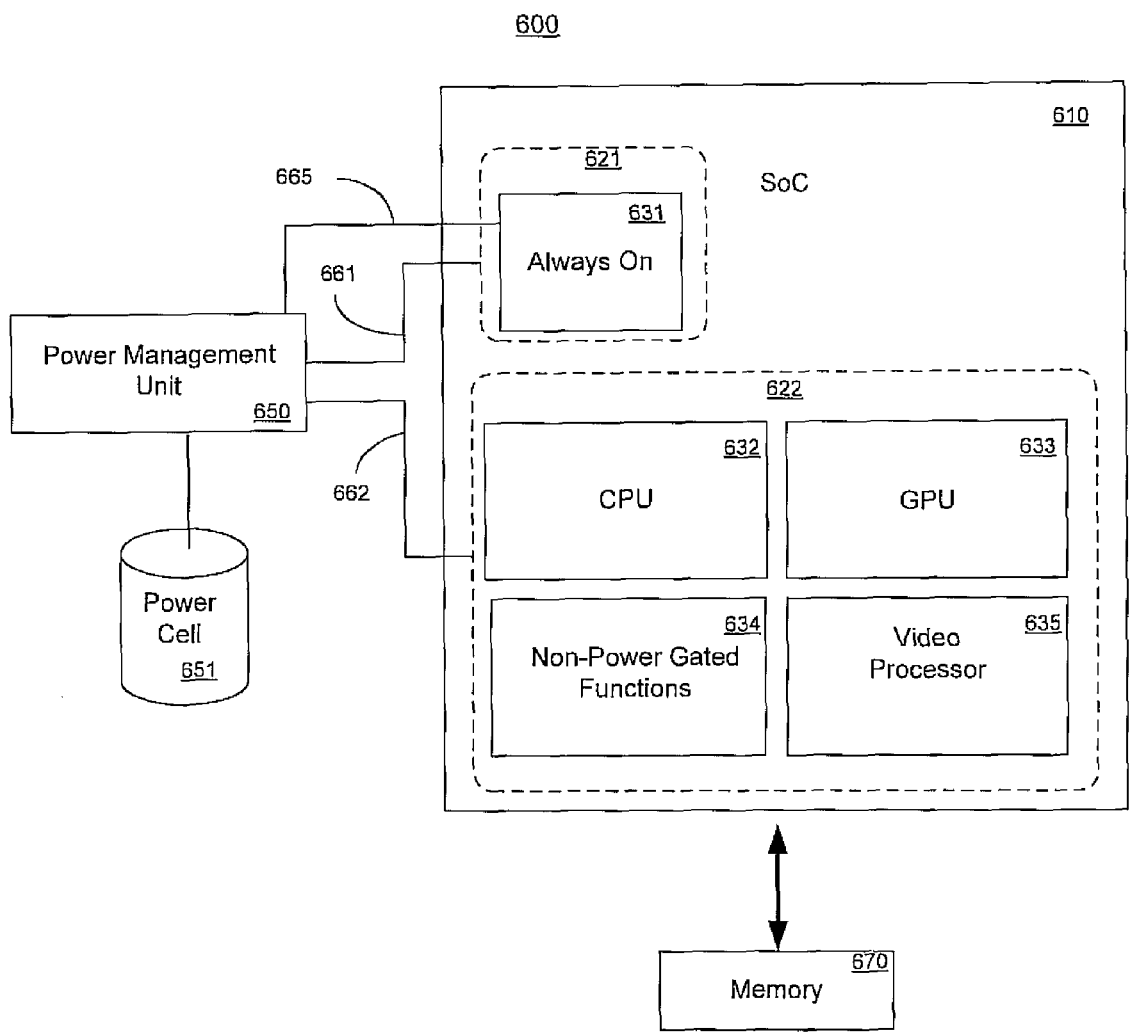
FIG. 6 shows an exemplary architecture that incorporates a video processor in accordance with one embodiment of the present invention.

FIG. 6 shows an exemplary architecture that incorporates the video processor 635 in accordance with one embodiment of the present invention. As depicted in FIG. 6, system 600 embodies a programmable SOC integrated circuit device 610 which includes a two power domains 621 and 622. The power domain 621 includes an "always on" power island 631. The power domain 622 is referred to as the core of the SOC and includes a CPU power island 632, a GPU power island 633, a non-power gated functions island 634, and an instance of the video processor 111. The FIG. 6 embodiment of the system architecture 600 is targeted towards the particular intended device functions of a battery-powered handheld SOC integrated circuit device. The SOC 610 is coupled to a power management unit 650, which is in turn coupled to a power cell 651 (e.g., one or more batteries). The power management unit 650 is coupled to provide power to the power domain 621 and 622 via the dedicated power rail 661 and 662, respectively. The power management unit 650 functions as a power supply for the SOC 610. The power management unit 650 incorporates power conditioning circuits, voltage pumping circuits, current source circuits, and the like to transfer energy from the power cell 651 into the required voltages for the rails 661-662.

In the FIG. 6 embodiment, the video processor 111 is within the domain 622. The video processor 111 provides specialized video processing hardware for the encoding of images and video. As described above, the hardware components of the video processor 111 are specifically optimized for performing real-time video encoding. The always on power island 631 of the domain 621 includes functionality for waking up the SOC 610 from a sleep mode. The components of the always on domain 621 will remain active, waiting for a wake-up signal. The CPU power island 632 is within the domain 622. The CPU power island 632 provides the computational hardware resources to execute the more complex software-based functionality for the SOC 610. The GPU power island 633 is also within the domain 622. The GPU power island 633 provides the graphics processor hardware functionality for executing 3-D rendering functions.

Figure 7:
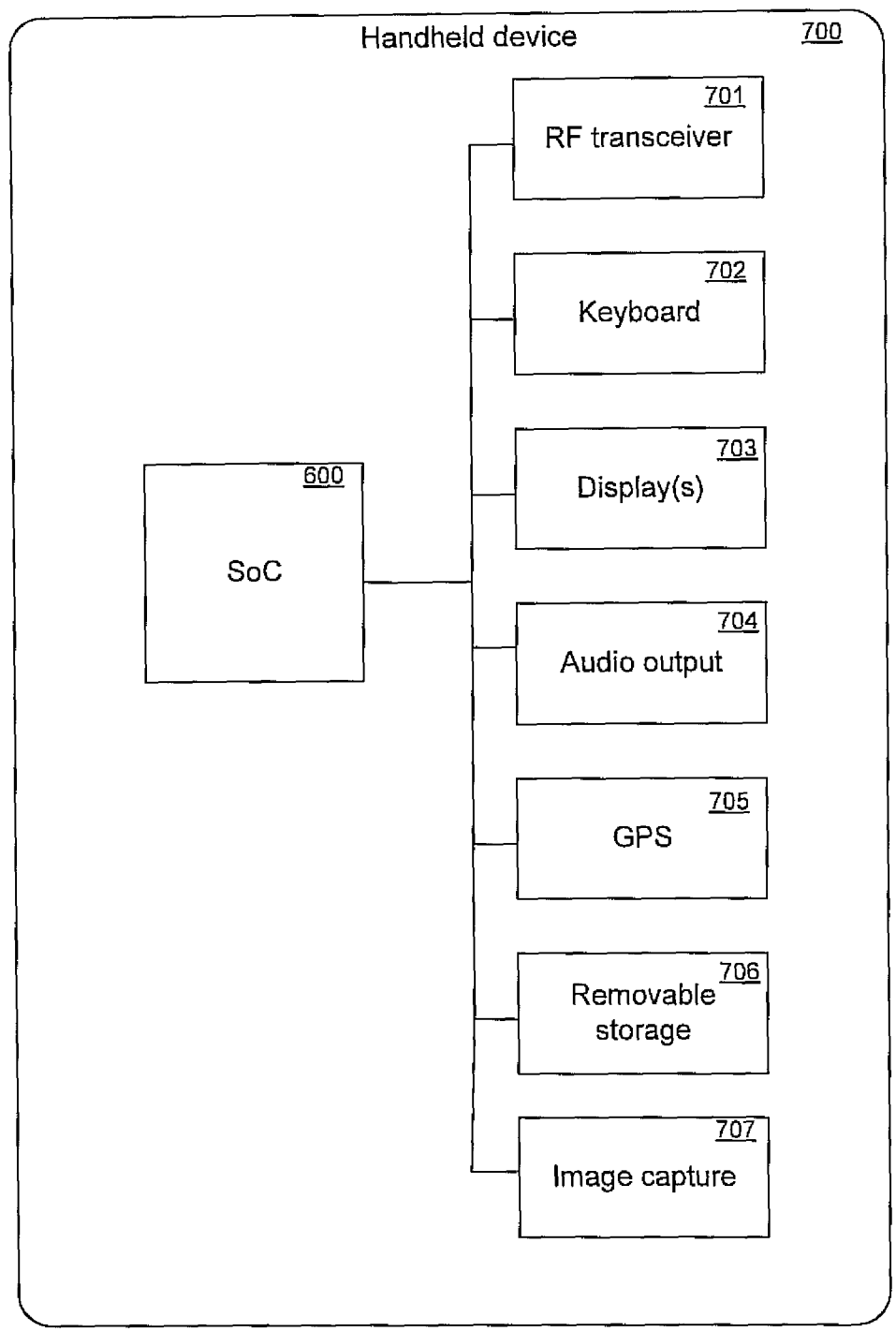
FIG. 7 shows a diagram showing the components of a handheld device in accordance with one embodiment of the present invention.

FIG. 7 shows a diagram showing the components of a handheld device 700 in accordance with one embodiment of the present invention. As depicted in FIG. 7, a handheld device 700 includes the system architecture 600 described above in the discussion FIG. 6. The handheld device 700 shows peripheral devices 701-707 that add capabilities and functionality to the device 700. Although the device 700 is shown with the peripheral devices 701-707, it should be noted that there may be implementations of the device 700 that do not require all the peripheral devices 701-707. For example, in an embodiment where the display(s) 703 are touch screen displays, the keyboard 702 can be omitted. Similarly, for example, the RF transceiver can be omitted for those embodiments that do not require cell phone or WiFi capability. Furthermore, additional peripheral devices can be added to device 700 beyond the peripheral devices 701-707 to incorporate additional functions. For example, a hard drive or solid state mass storage device can be added for data storage, or the like.

The RF transceiver 701 enables two-way cell phone communication and RF wireless modem communication functions. The keyboard 702 is for accepting user input via button pushes, pointer manipulations, scroll wheels, jog dials, touch pads, and the like. The one or more displays 703 are for providing visual output to the user via images, graphical user interfaces, full-motion video, text, or the like. The audio output component 704 is for providing audio output to the user (e.g., audible instructions, cell phone conversation, MP3 song playback, etc.). The GPS component 705 provides GPS positioning services via received GPS signals. The GPS positioning services enable the operation of navigation applications and location applications, for example. The removable storage peripheral component 706 enables the attachment and detachment of removable storage devices such as flash memory, SD cards, smart cards, and the like. The image capture component 707 enables the capture of still images or full motion video. The handheld device 700 can be used to implement a smart phone having cellular communications technology, a personal digital assistant, a mobile video playback device, a mobile audio playback device, a navigation device, or a combined functionality device including characteristics and functionality of all of the above.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for executing video encoding operations, comprising:
   encoding an incoming video stream into a plurality of macro blocks by using a video encoder;
   receiving a box out slice map specification for the plurality of macro blocks;
   converting the box out slice map specification to a foreground-background slice map specification; and
   processing the plurality of macro blocks in accordance with the foreground-background specification and by using a common hardware encoder front end, wherein the box out slice map specification comprises a spiral pattern slice map specification.

2. The method of claim 1, wherein the slice map specification is received from a video application executing on the video encoder.

3. The method of claim 1, wherein the common encoder hardware front end processes macro blocks having the foreground-background specification, and wherein macro blocks having the box out slice map specification are converted to the foreground-background slice map specification before processing by the common hardware encoder front end.

4. The method of claim 1, wherein the foreground-background slice map specification is defined by specified rectangular coordinates of a top corner and a bottom corner of each of a plurality of rectangles within a video frame.

5. The method of claim 1, wherein the video encoder is an H.264 video encoder.

6. The method of claim 1, wherein the converting of the box out slice map specification to the foreground-background slice map specification is implemented by a software driver of the video encoder.

7. A hand held device for implementing video encoding operations, comprising:
   a computer system having a processor coupled to a memory and a video encoder, the memory having computer readable code which when executed by the processor causes the hand held device to:
   encode an incoming video stream into a plurality of macro blocks by using a video encoder;
   receive a box out slice map specification for the plurality of macro blocks;
   convert the box out slice map specification to a foreground-background slice map specification; and
   process the plurality of macro blocks in accordance with the foreground-background specification and by using a common hardware encoder front end of the video encoder, wherein the box out slice map specification comprises a spiral pattern slice map specification.

8. The hand held device of claim 7, wherein the slice map specification is received from a video application executing on the video encoder.

9. The hand held device of claim 7, wherein the common encoder hardware front end processes macro blocks having the foreground-background specification, and wherein macro blocks having the box out slice map specification are converted to the foreground-background slice map specification before processing by the common hardware encoder front end.

10. The hand held device of claim 7, wherein the foreground-background slice map specification is defined by specified rectangular coordinates of a top corner and a bottom corner of each of a plurality of rectangles within a video frame.

11. The hand held device of claim 7, wherein the video encoder is an H.264 video encoder.

12. The hand held device of claim 7, wherein the converting of the box out slice map specification to the foreground-background slice map specification is implemented by a software driver of the video encoder.

13. A computer system for implementing real time video encoding operations, comprising:
   a processor coupled to a memory and a video encoder, the memory having computer readable code which when executed by the processor causes the computer system to:
   encode an incoming video stream into a plurality of macro blocks by using a video encoder;

receive a box out slice map specification for the plurality of macro blocks;

convert the box out slice map specification to a foreground-background slice map specification, wherein the foreground-background slice map specification is defined by specified rectangular coordinates of a top corner and a bottom corner of each of a plurality of rectangles within a video frame; and process the plurality of macro blocks in accordance with the foreground-background specification and by using a common hardware encoder front end of the video encoder, wherein the box out slice map specification comprises a spiral pattern slice map specification.

14. The computer system of claim 13, wherein the slice map specification is received from a video application executing on the video encoder.

15. The computer system of claim 13, wherein the common encoder hardware front end processes macro blocks having the foreground-background specification, and wherein macro blocks having the box out slice map specification are converted to the foreground-background slice map specification before processing by the common hardware encoder front end.

16. The computer system of claim 13, wherein the video encoder is an H.264 video encoder.

17. The computer system of claim 13, wherein the converting of the box out slice map specification to the foreground-background slice map specification is implemented by a software driver of the video encoder.

18. The computer system of claim 13 further comprising a pseudo foreground-background pattern defined by two pairs of rectangular coordinates.

\* \* \* \* \*